United States Patent [19]

Choi

[11] Patent Number: 5,434,839
[45] Date of Patent: Jul. 18, 1995

[54] DISC LOADING APPARATUS FOR AN OPTICAL DISC PLAYER USING A SINGLE MOTOR FOR HORIZONTAL AND VERTICAL MOVEMENT OF THE DISC TRAY

[75] Inventor: Byoung J. Choi, Gwangmyung-si, Rep. of Korea

[73] Assignee: Goldstar Co., Ltd., Seoul, Rep. of Korea

[21] Appl. No.: 971,554

[22] Filed: Nov. 5, 1992

[30] Foreign Application Priority Data

Nov. 7, 1991 [KR] Rep. of Korea ............... 19768/1991

[51] Int. Cl.[6] ............................................. G11B 33/02
[52] U.S. Cl. .................................. 369/75.2; 369/77.1
[58] Field of Search .................. 369/75.2, 77.1, 77.2; 360/99.06, 99.07, 96.5

[56] References Cited

U.S. PATENT DOCUMENTS 5,093,818  3/1992  Suzuki ................................ 369/34
5,166,917  11/1992  Decoster et al. ................. 369/77.1
5,172,360  12/1992  Decoster .......................... 369/75.2
5,237,555  8/1993  Tsuruta et al. .................... 369/77.1

Primary Examiner—Stuart S. Levy
Assistant Examiner—William R. Korzuch
Attorney, Agent, or Firm—Birch, Stewart, Kolasch & Birch

[57] ABSTRACT

This invention relates to a disc loading apparatus for an optical disc player, which uses a single motor to horizontally and vertically move a tray with an optical disc placed therein, thereby accomplishing loading of the disc. The loading apparatus includes a motor disposed at one of the support plates secured on a main plate; a power transmission for reducing and transmitting the power generated by the motor; a tray transfer device adapted to receive the power of the motor through the power transmission, thereby moving the tray horizontally and vertically a tray transfer guiding device disposed on the main plate to guide the tray transfer movement of the tray transfer device; and a turning station for rotating the disc transferred thereto and loaded thereon by the tray transfer device and the tray transfer guiding device.

5 Claims, 12 Drawing Sheets

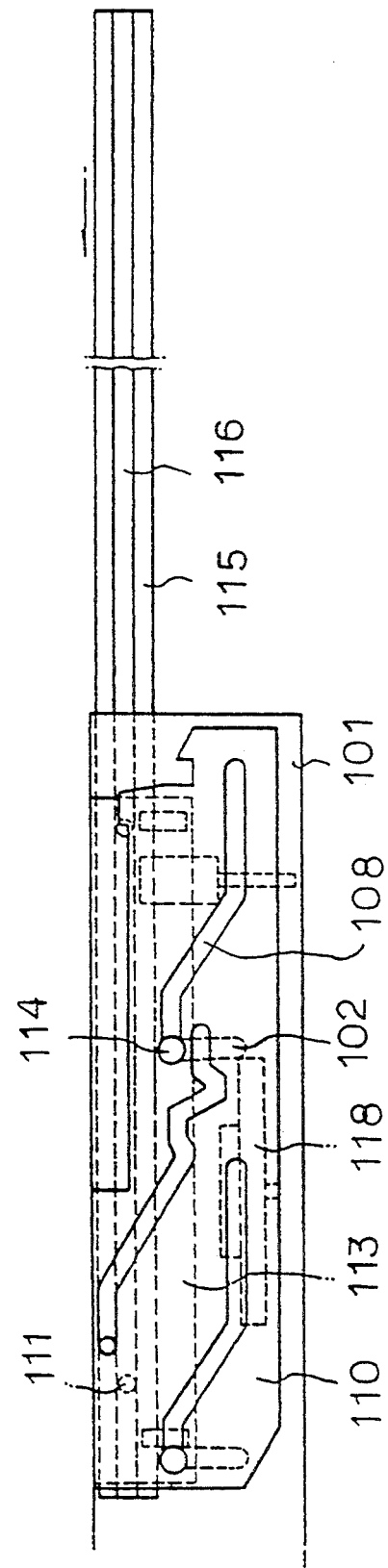

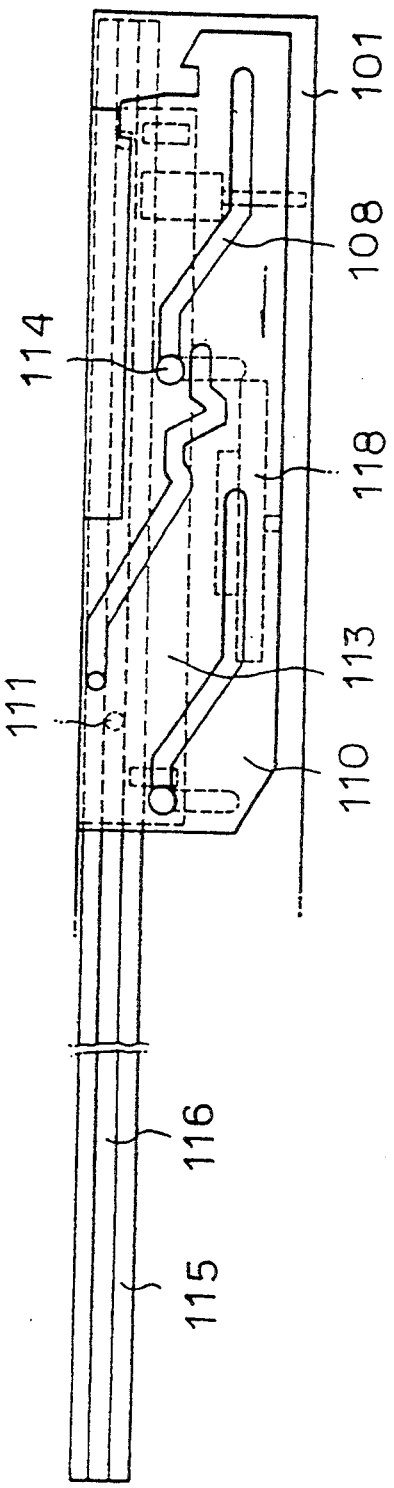

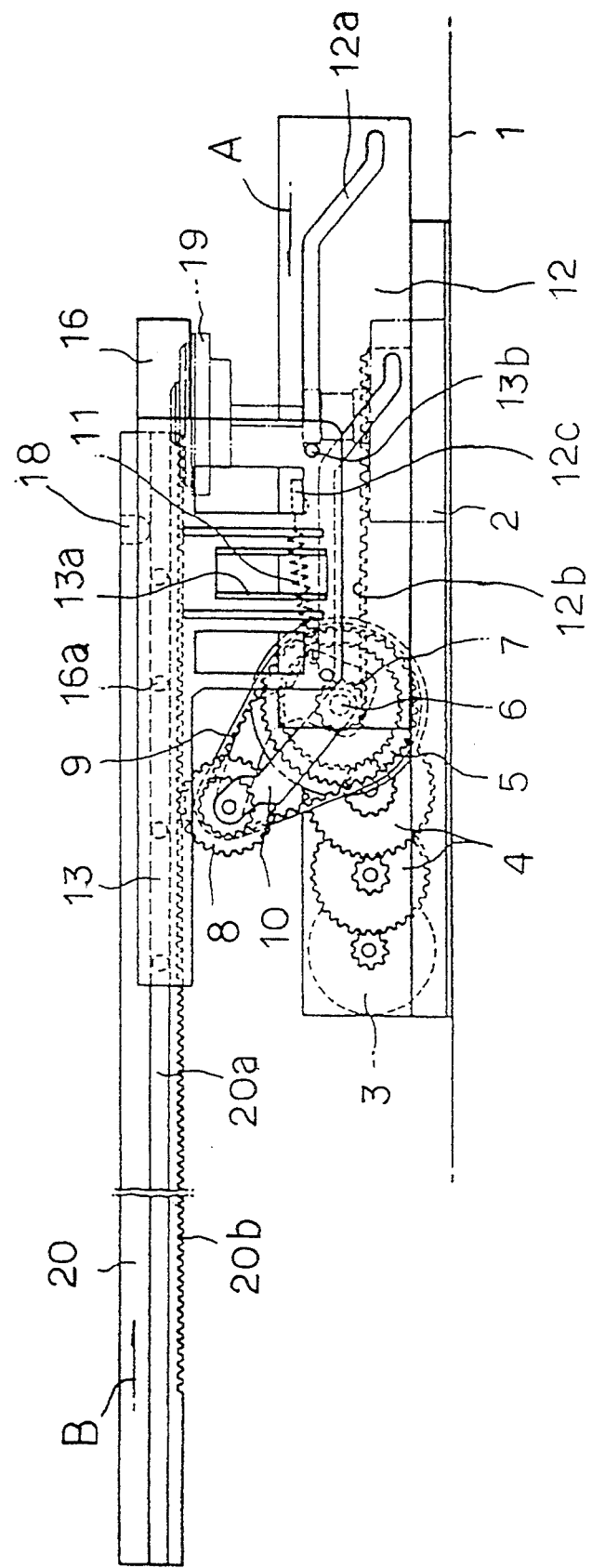

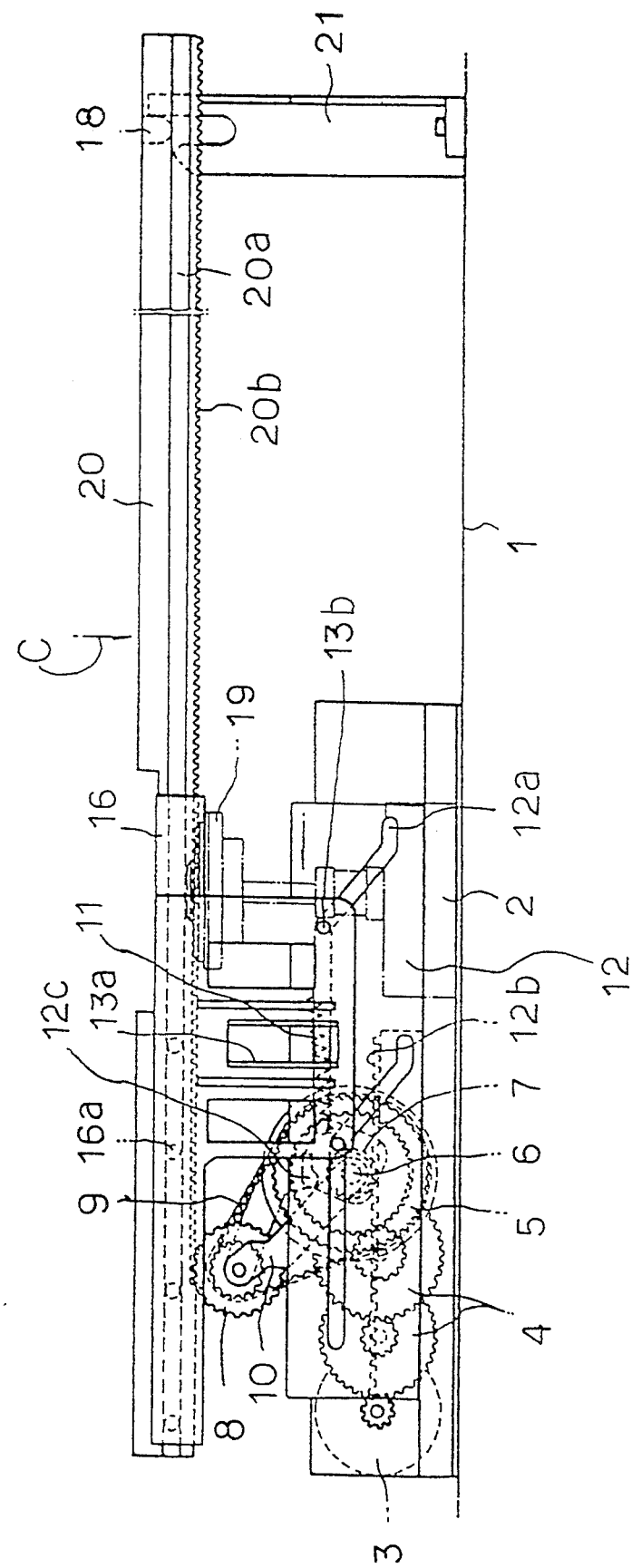

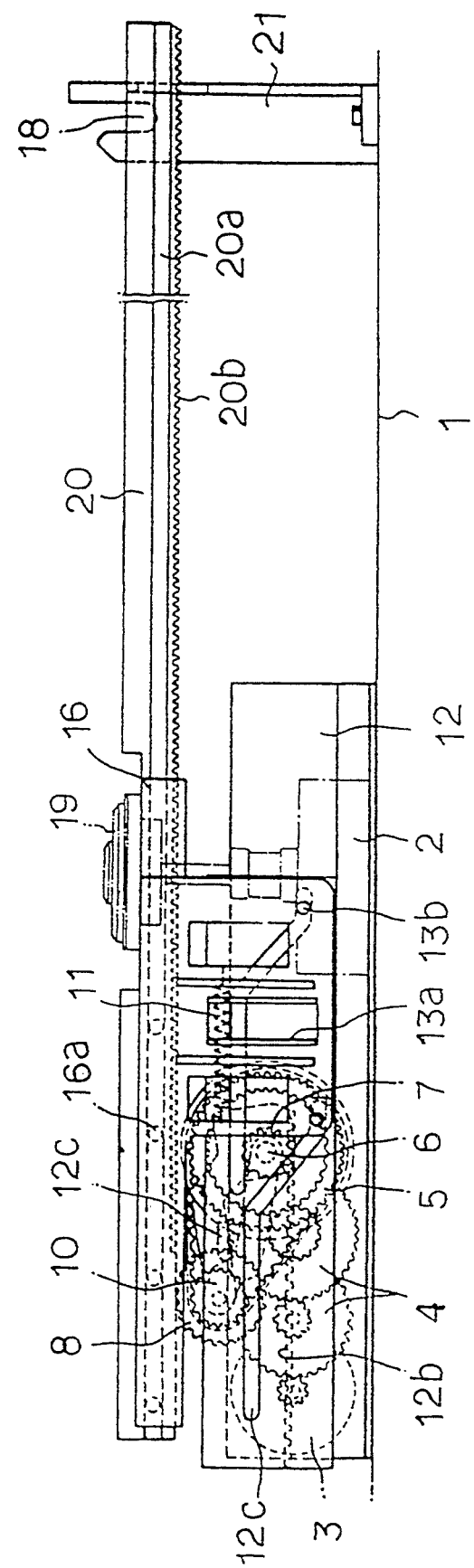

DISC LOADING APPARATUS FOR AN OPTICAL DISC PLAYER USING A SINGLE MOTOR FOR HORIZONTAL AND VERTICAL MOVEMENT OF THE DISC TRAY

BACKGROUND OF THE INVENTION

1. Field of the Invention

This invention relates to a disc loading apparatus for an optical disc player, and more particularly a disc loading apparatus for an optical disc player, which uses a single motor to move a tray horizontally and vertically with a disc put therein, thereby loading the disc into a turning station.

2. Description of the Prior Art

Generally, an optical disc player is an apparatus which carries out playback of the sound recorded on a disc by moving a tray horizontally and vertically with the disc put therein into a loading apparatus to load the disc into a turning station, and then projecting a laser beam onto the surface of the disc during rotation of a turntable. The player usually includes two loading motors to execute the loading of the disc.

As shown in FIGS. 1 and 2 of the accompanying drawings, the prior disc loading apparatus for the optical disc player comprises a main plate 101 integrally having opposite side plates each formed with a pair of vertically elongated holes 102, two motors 103 and 104 disposed on the main plate to provide power for the horizontal and vertical movements, respectively, and reduction gears 106 and 107 for the horizontal and vertical movements provided to reduce the power transmitted from the motors 103 and 104 to them via power transmission belts 105.

Further, each of the opposite side plates of the main plate 101 has a movable plate 110 disposed on its exterior surface and a support plate 113 disposed on its interior surface. The movable plate 110 is provided with a pair of slots 108 each shaped to have horizontally extending end portions and a sloping portion interconnecting the end portions, as shown in FIG. 3, and a rack 109 formed on its interior surface. The support plate 113 is provided with a plurality of guide projections 111 and a pinion 112 for the horizontal movement of the tray. At its one side, each support plate 113 is fixedly supported on each movable plate 110 via support pins 114, and pinion 112 disposed at the other side of the support plate is meshed with the reduction gear 106 for the horizontal movement.

With this construction, when the motor 103 for the horizontal movement is driven to perform the horizontal movement of the tray 115, the tray is moved in a horizontal direction, i.e., from the position shown if in FIG. 3a to that shown in FIG. 3b through the arrangement in which guide grooves formed in the opposite sides and lower surface of the tray is engaged with the guide projections 111 of the support plate 113 and a rack 117 formed at one side of the lower surface of the support plate 113 and a rack 117 formed at one side of the lower surface of the tray is meshed with the pinion 112 disposed on the support plate, as shown in FIG. 2a.

Meanwhile, when the motor 104 for the vertical movement is driven to perform the vertical movement of the tray, the tray is moved in a vertical direction, i.e., from the position shown in FIG. 3c to that shown in FIG. 3d through the arrangement in which a pinion 118 for the vertical movement disposed on the base surface of the main plate 101 is meshed at one side with the rack 109 of the movable plate 110 and at the other side with the reduction gear 107 for the vertical movement, as shown in FIG. 1. At this time, the motors 103, 104 may be controlled by separate control means (not shown) in a control section to selectively carry out forward and reverse rotations.

Operation of the loading apparatus thus constructed will now be described in more detail with reference to FIGS. 2 and 3.

First, in the action of loading the tray with the disc put therein into the loading apparatus, when the user puts the disc in the tray 115, and then pushes a loading button (not shown), the horizontal movement motor 103 is rotated counterclockwise, and the rotational force of the motor is transmitted to and reduced by the reduction gear 106. Then, the reduced force is transmitted to the horizontal movement pinion 112 of the support plate 113 to rotate it. The rotation of the pinion 112 is converted into horizontal linear motion by the rack 117 formed at one side of the lower surface of the tray and meshed with the pinion. As a result, the tray 115 is moved horizontally in the direction of the arrow from the position as shown in FIG. 3a to that as shown in FIG. 3b.

Then, after completion of the horizontal movement of the tray, the horizontal movement motor 103 is turned off, and at the same time the vertical movement motor 104 is turned on to rotate counterclockwise. The rotational force of the motor 104 transmitted to the reduction gear 107 via the belt 105 is reduced by the gear, and then teansmitted to the pinion 118 which is disposed on the base surface of the main plate 101 and meshed with the rack 109 of the movable plate 110. Then, the rotation of the pinion 118 is converted into linear motion by the rack 109 so that the movable plate is moved horizontally in the direction shown by the arrow in FIG. 3b, i.e., in the leftward direction as viewed in the figure. At the same time, as shown in FIG. 3c, the support pins 114 attached to the support plate 113 are displaced to their lower positions along the sloping portions of the slots 108 of the movable plate 110, while being guided by the vertically elongated holes 102 of the main plate 101. As a result, the tray 115 engaged with the projections 111 of the support plates 113 descends vertically. That is, the horizontal movement of the movable plate 110 causes the vertical movement of the tray 115 by the vertical height of the sloping portion of each slot 108.

After completion of the vertical movement of the tray through the procedure set forth above, the tray is in the state shown in FIG. 3d. Thereafter, the turntable 120 mounted on the main plate 101 is inserted into a guide opening 121 formed in one side of the tray. At this time, the top of the turntable is positioned higher than the upper surface of the tray such that the disc 119 put in the upper portion of the tray is set on the turntable, as shown in FIG. 2b. Then, upon completion of the setting of the disc, the vertical movement motor 104 is turned off, so that the disc loading operation is completed.

After completion of the disc loading operation, the playback of the sound recorded on the disc 119 is performed by projecting the laser beam onto the surface of the disc by separate means (not shown), while rotating the turntable 120 with the disc set thereon.

Meanwhile, "ON" and "OFF" of the horizontal and vertical movement motors 103 and 104 may be controlled by separate switching means (not shown) in the control section. Also, unloading of the disc for withdrawing or exchanging the loaded disc is carried out in the reverse order to the loading action stated above.

As described above, however, the prior art loading apparatus needs two motors for moving horizontally and vertically the tray, the complex power transmission means for transmitting the power of the motors, and the switching means for controlling "ON" and "OFF" of the motors at the control section to allow the horizontal and vertical movements of the tray to be executed continuously as single action. The requirements of a plurality of these parts result in higher manufacturing cost and lower productivity.

SUMMARY OF THE INVENTION

With the foregoing drawbacks of the prior art in view, it is an object of the present invention to provide a disc loading apparatus for an optical disc player, which uses a single motor to move a tray horizontally and vertically with a disc put therein, thereby loading the disc into a turning station, whereby a reduction in the number of the parts and a simplification of a construction are achieved, resulting in higher productivity and a reduction in costs.

To achieve the above object, there is provided according to one form of the present invention a disc loading apparatus for an optical disc player, comprising a motor disposed at one of opposite support plates secured on a main plate; power transmission means for reducing and transmitting power generated by the motor; tray transfer means adapted to receive the power of the motor through the power transmission means, thereby moving a tray horizontally and vertically tray transfer guiding means disposed on the main plate to guide the tray transfer movement of the tray transfer means; and a turning station for rotating a disc transferred thereto and loaded thereon by the tray transfer means and the tray transfer guiding means.

BRIEF DESCRIPTION OF THE DRAWINGS

In the accompanying drawings:

FIG. 3a is a schematic side view showing the essential section of the prior art loading apparatus before the tray is moved horizontally;

FIG. 3b is a schematic side view showing the state in which the horizontal movement of the tray has been completed;

FIG. 7a is a schematic side view showing the loading apparatus of the present invention before the tray is moved horizontally;

FIG. 7b a schematic side view showing the state in which the horizontal movement of the tray has been completed; and FIG. 7c is a schematic side view showing the state in which the vertical movement of the tray has been completed.

DESCRIPTION OF THE PREFERRED EMBODIMENT

The invention will now be described in detail, by way of example, with reference to FIGS. 4 to 7 of the accompaying drawings.

Figure 1:
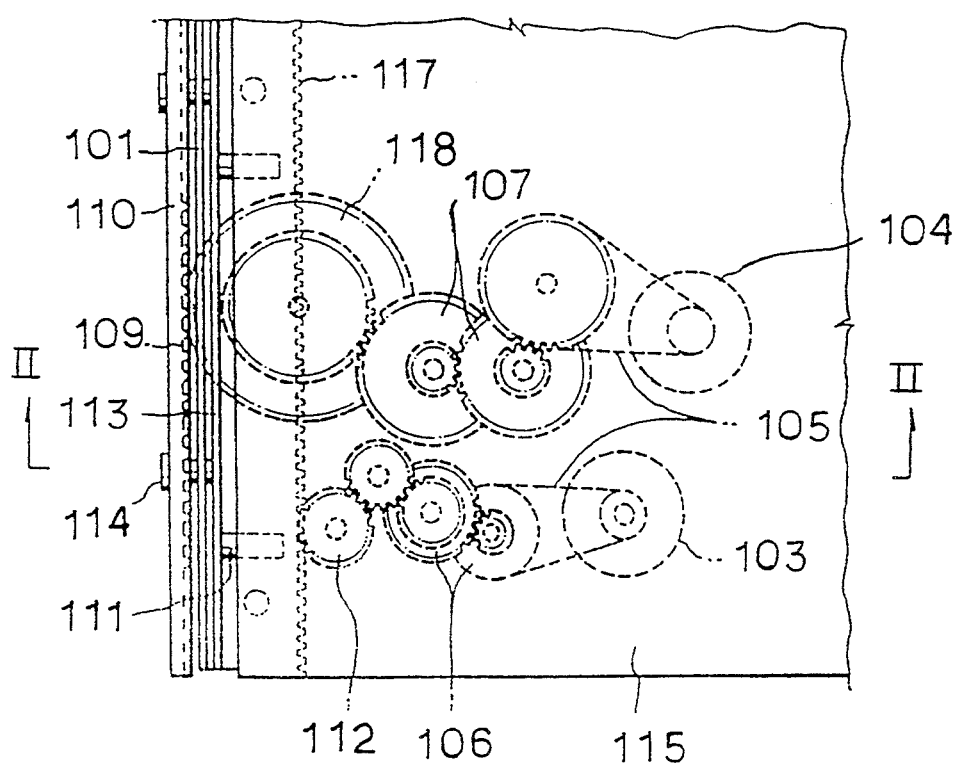
FIG. 1 is a plan view of the essential section of a disc loading apparatus for an optical disc player according to the prior art.
Figure 2A:
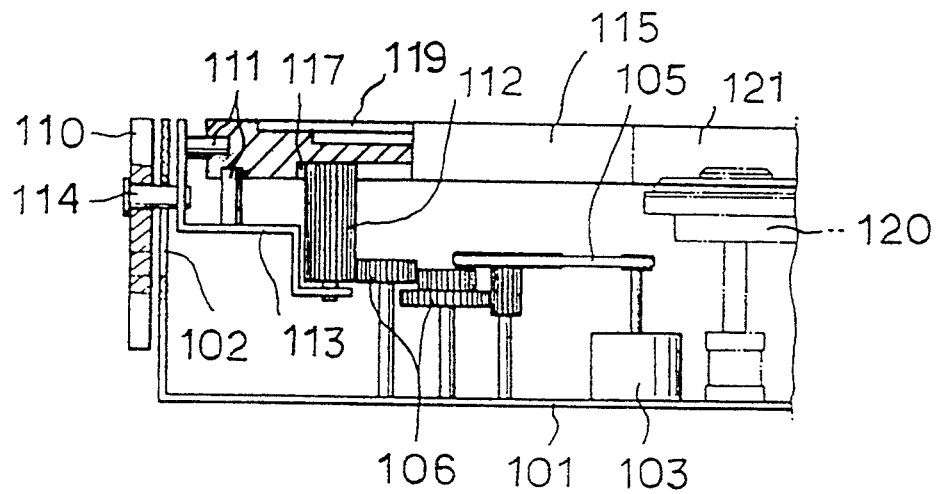
FIG. 2a is a cross-sectional view taken along line II—II of FIG. 1, showing the state in which a tray has been moved horizontally.
Figure 2B:
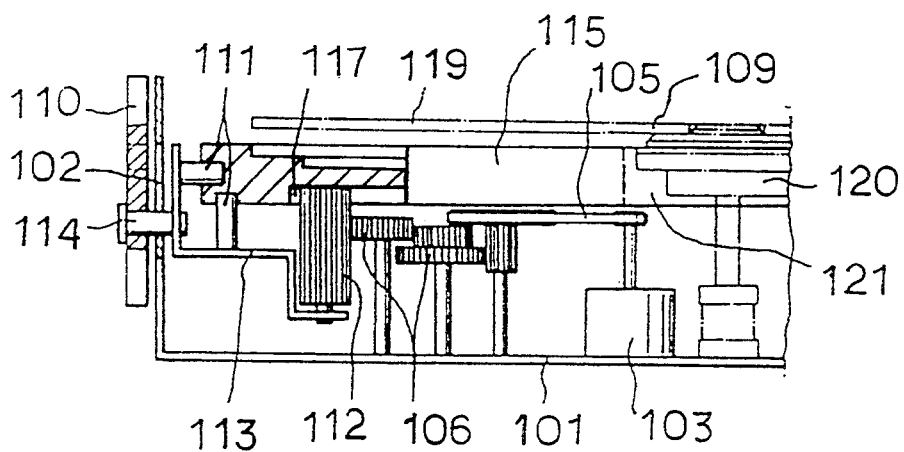
FIG. 2b is a cross-sectional view similar to FIG. 2a, but showing the state in which the tray has been moved vertically.
Figure 3C:
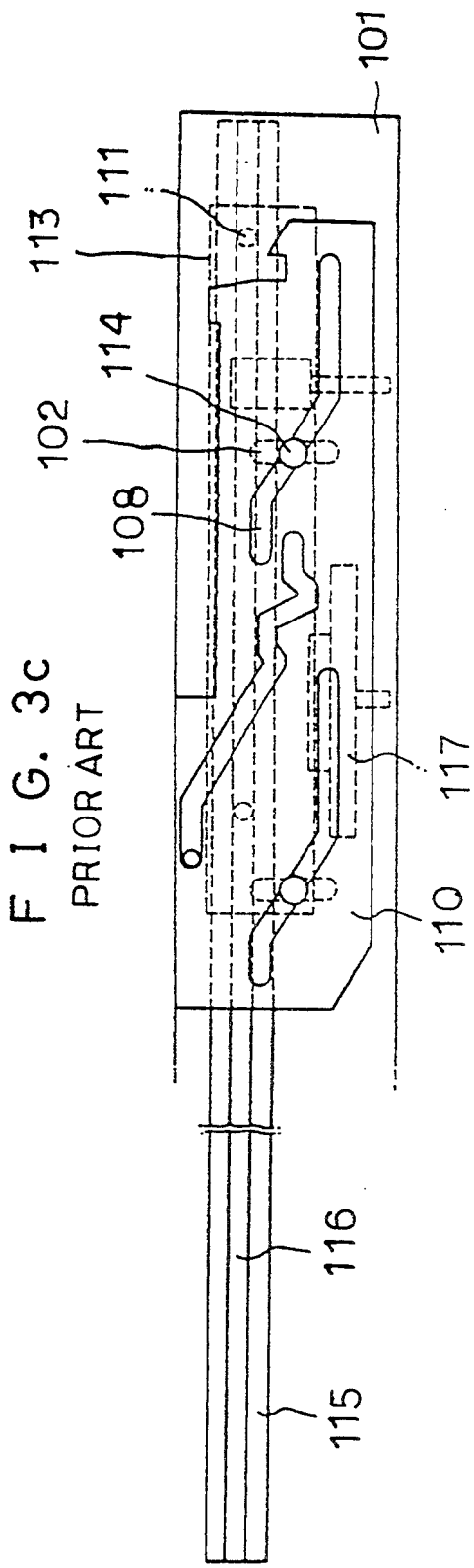
FIG. 3c is a schematic side view showing the state in which the tray is being moved vertically from the position in FIG. 3b.
Figure 3D:
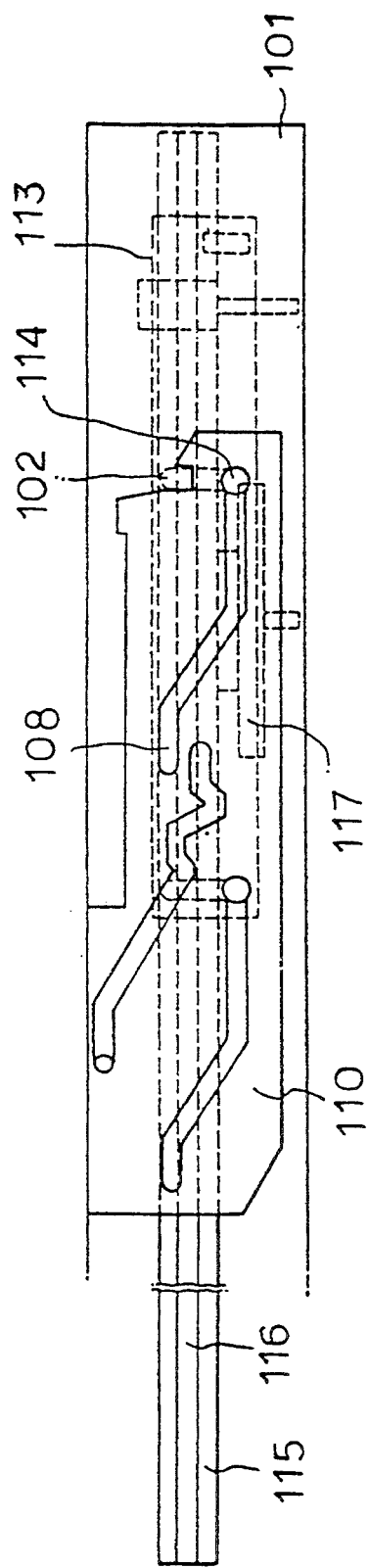
FIG. 3d is a schematic side view showing the state in which the vertical movement of the tray has been completed.
Figure 4:
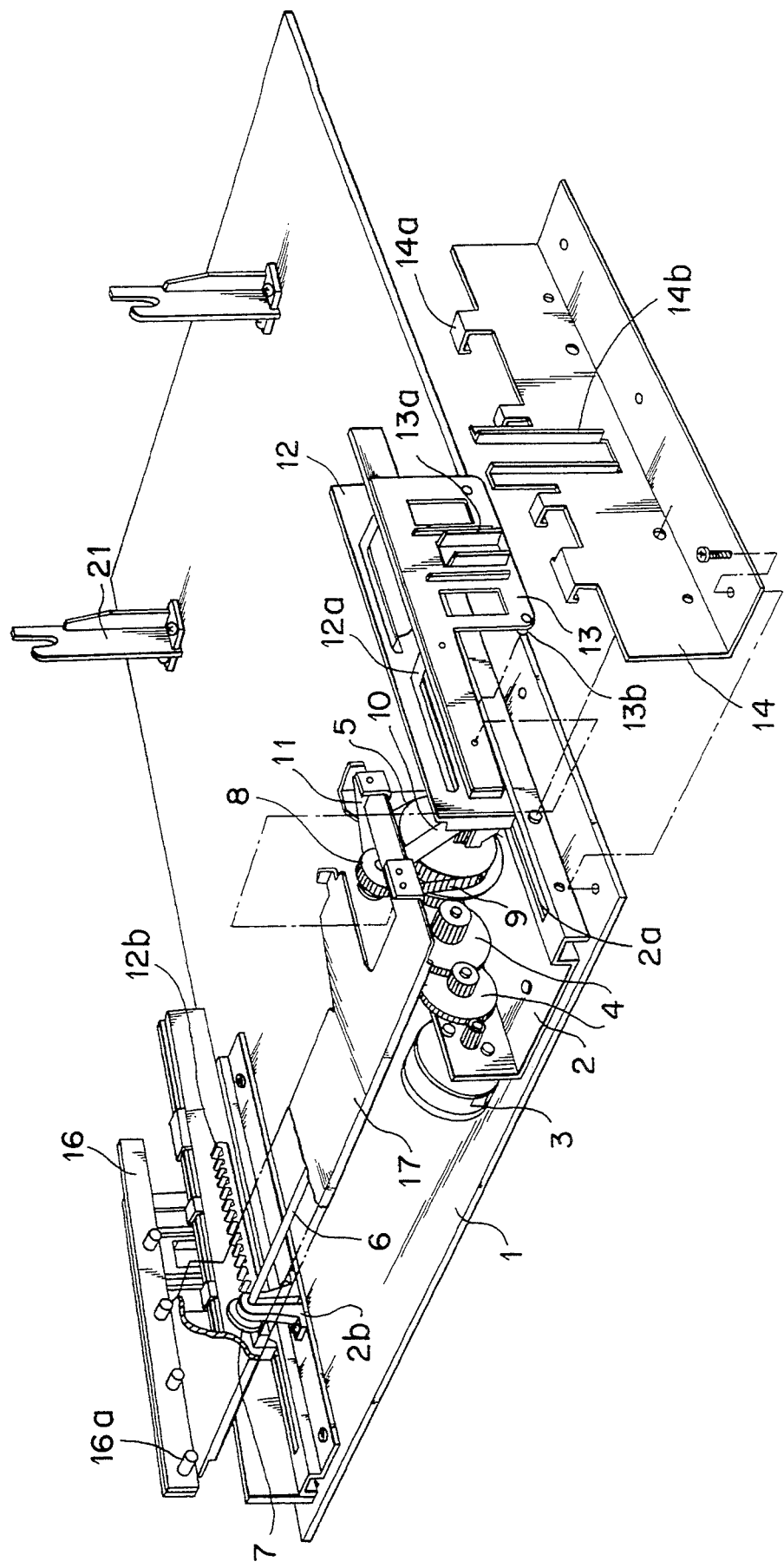
FIG. 4 is an exploded perspective view of a disc loading apparatus for on optical disc player according to the present invention.
Figure 5:
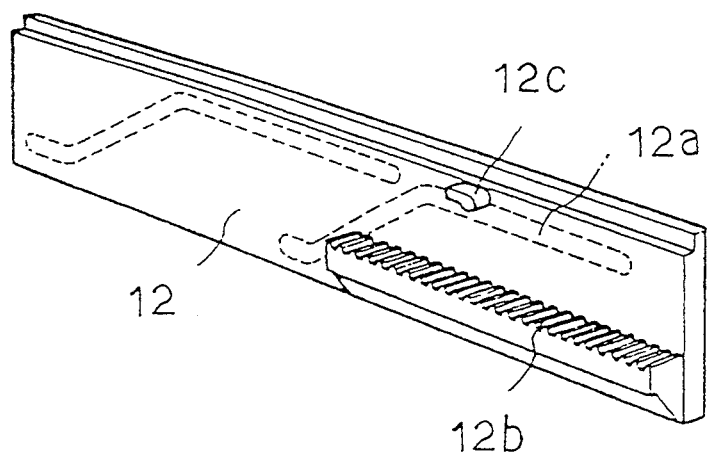
FIG. 5 is a perspective view showing the interior surface of one of movable plates used in the loading apparatus according to the present invention.

FIG. 4 is an exploded perspective view of the essential section of a disc loading apparatus for an optical disc player according to one embodiment of the present invention, and FIG. 5 is a perspective view showing the interior surface of one of the movable plates 12 used in the disc loading apparatus of the present invention.

As shown in FIG. 4, the loading apparatus according to this embodiment comprises a pair of support plates 2 fixedly secured one to each of both side portions of a main plate 1 and each having a guide slot 2a formed longitudinally therein; a pair of guide plates 14 each secured to the outer surface of each support plate 2 and each having horizontal and vertical movement guide pieces 13a, 14b integral therewith; a transversely extending shaft 6 rotatably supported at opposite end portions on supports 2b which are each mounted on the inner bottom of each support plate 2; and pinions 7 for a vertical movement of a tray, disposed one at each of both ends of the shaft 6.

In addition, between the respective guide plates 14 and the respective pinions 7, there are disposed the movable plates 12 movable along the guide slots 2a of the support plates 2 and each formed with a pair of slots 12a, which are each shaped to have horizontally extending end portions and a sloping portion interconnecting the end portions. As shown in FIG. 5, each movable plate 12 also has a rack 12b mounted at the lower portion of the interior surface thereof and meshed with the pinion 7. Each movable plate is mounted for horizontal movement with its upper end slidably engaged with the horizontal movement guide pieces 14a of each guide plate 14 and its lower end slidably received in the guide slot 2a of each support plate 2.

Further, externally of the movable plates 12, there are disposed tray support plates 13 each having integral guide pieces 13a slidably engaged with the vertical movement guide pieces 14b of each guide plate 14 to guide the vertical movement of the tray 20 (see FIG. 6), and a pair of projections 13b formed at the lower portion of the inner surface thereof and provided with a plurality of guide projections 16a which are engaged with the tray 20 to support it. The opposite tray support plates 13 are interconnected by a fixing plate 17 transversely extending between them.

Furthermore, a reversible motor 3 is mounted at one of the opposite support plates 2 secured to the upper surface of the main plate 1, and power transmissin means comprised of a plurality of gears to reduce power of the motor 3 and transmit the reduced power to tray transfer means is coupled to the motor. More specifically, the power transmission means comprises a set of reduction gears 4 coupled to the motor 3, and a power transmission gear 5 mounted at one end of the shaft 6 to be meshed with the reduction gear 4. A pinion 8 for the horizontal movement of the tray is positioned above the power transmission gear 5 and connected to the gear by means of a power transmission chain or a timing belt 9. The pinion 8 is rotatably mounted at one end of a lever 10, which is biased by a coil spring 11 and at the other end mounted on one end of the shaft 6 for pivotal movement about the shaft through a given angle.

Further, as shown in FIG. 5, one of the movable plates 12 is also provided on its interior surface with an actuation member 12c which serves to push the lever 10 at the end of the horizontal movement of the movable plate so that the pinion 8 is disengaged from a rack 20b (will be described later), to thus stop the horizontal movement of the tray.

Figure 6A:
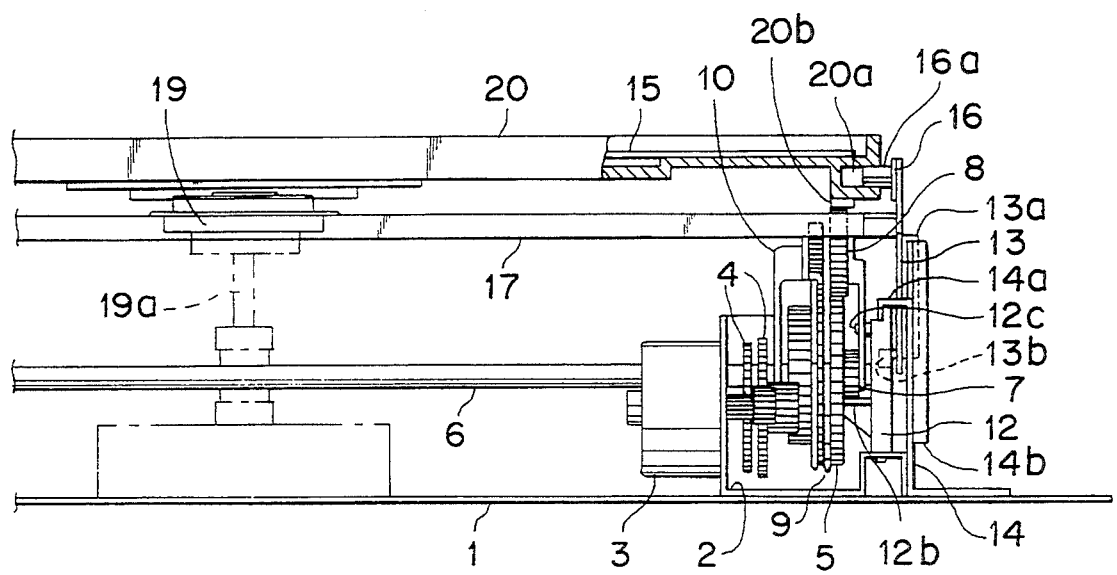
FIG. 6a is a front view of the loading apparatus of the present invention in the state in which a tray has been moved horizontally.

As shown in FIG. 6, the tray 20 has guide grooves 20a formed in the opposite side surfaces thereof and engaged with the guide projections 16a of the tray guide plates 16, and the rack 20b formed at one side of its lower surface to be meshed with the pinion 8 for the horizontal movement of the tray.

At the rear portion of the main plate 1, there is disposed a turning station, into which the disc: carried by the tray transfer means is loaded. The turning station comprises a rotating shaft 19a driven by a rotational force of a separate motor and a turntable 19 mounted at the top of the rotating shaft for rotation therewith.

Reference Numerals 15, 18 and 21 designate the disc, locking members provided at the rear end of the tray 20, and stoppers secured to the rear end portion of the main plate 1, respectively.

Operation of the thus constructed apparatus of the present invention will now be explained with reference to FIGS. 6 and 7.

First, in the action of loading the disc into the loading apparatus, when the user puts the disc 15 in the tray 20, and then pushes a loading button (not shown), as shown in FIG. 7a, the motor 3 mounted on the main plate 1 is rotated, and the rotational force of the motor is transmitted through the reduction gear 4 to the power transmission gear 5 secured to one end of the shaft 6. Thus, the pinions 7 disposed at both ends of the shaft and meshed with the racks 12b of the movable plates 12 are rotated, so that the movable plates are moved horizontally in the direction shown by arrow A in FIG. 7a. At the same time, the pinion 8 coupled to the power transmission gear 5 via the timing belt 8 and biased by the spring 11 to be meshed with the rack 20b of the tray 20 is rotated, so that the tray is moved horizontally in the direction shown by arrow B in FIG. 7a to the position shown in FIG. 7b, which illustrates the state in which the horizonal movement of the tray has been completed.

At this time, the movable plates 12 are moved under guidance of the guide slots 2a of the support plates 2 and the horizontal movement guide pieces 14a of the guide plates 14, and the projections 13b of the tray support plates 13 are guided along the horizontally extending portions of the slots 12a of the movable plates. Also, the horizontal movement of the tray 20 is guided by the guide projections 16a of the tray guide plates 16, which are slidably engaged with the tray guide grooves 20a. Moreover, in the state in which the horizontal movement of the tray has been completed, the locking members 18 provided at the rear end of the tray are caught by the stoppers 21 secured to the rear portion of the main plate 1, as shown in FIG. 7b.

Thereafter, as the motor 3 is driven continuously, and the movable plates 12 are moved continuously, the lever 10 is pushed by the actuating member 12c on the interior surface of the one of the movable plates, to thus be pivotted about the shaft 6 through a given angle. As a result, the horizontal movement pinion 8 disposed at the top of the lever is disengaged from the rack 20b of the tray 20, so that the horizontal movement of the tray is terminated. Also, with the continuous movement of the movable plates 12, the projectioons 13b of the tray support plates 13 slidably received in the slots 12a of the movable plates are moved downwardly along the sloping portions of the slots 12a, so that the tray support plates 13 interconnected by the fixing plate 17 descend vertically along with the tray 20 in the direction shown by arrow C in FIG. 7b. At this time, the vertical movement of the tray is guided by the vertical movement guide pieces 14b of the guide plates 14, which are held in slidable engagement with the guide pieces 13a of the tray supports plates 13.

Figure 6B:
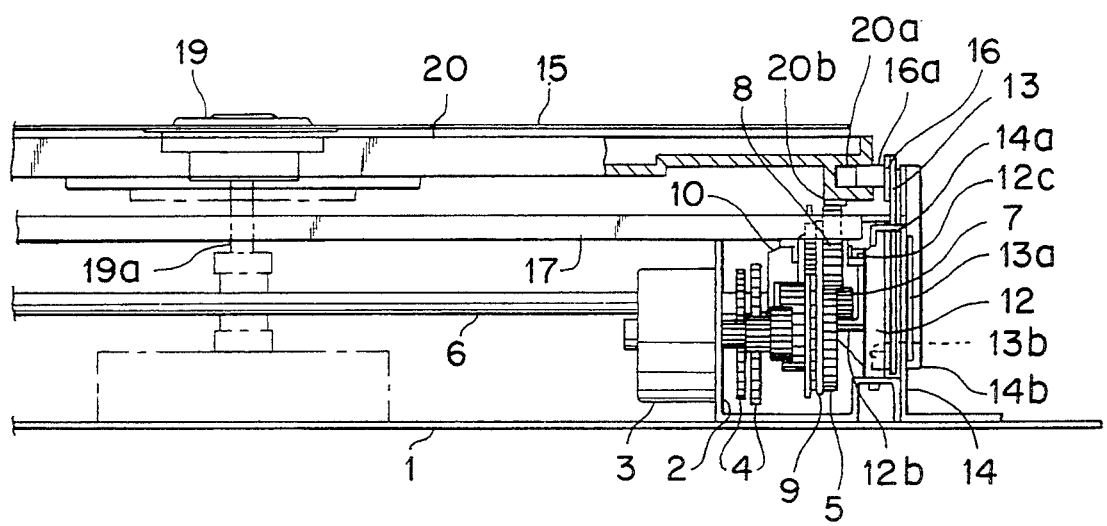
FIG. 6b is a view similar to FIG. 6a, but showing the state in which the tray has been moved vertically.

In this manner, as the tray 20 with the disc 15 put therein descends vertically, the disc is loaded on the turntable 19 extending through a guide opening formed in the tray, as shown in FIG. 6b. The state in which the vertical movement of the tray has been completed is shown in FIGS. 6b and 7c.

In such a disc loaded state, playback of the sound recorded on the disc may be performed in a conventional manner. Unloading of the disc is carried out in the reverse order to the loading operation set forth above, and therefore not explained.

From the foregoing it will be appreciated that the present invention allows loading of the disc into the turning station by using a single motor, whereby a reduction in the number of the parts and a simplification of a construction are achieved, resulting in higher productivity and a reduction in costs.

While the invention has been shown and described with particular reference to a preferred embodiment thereof, it will be understood that variations and modifications in form and detail may be made therein without departing from the spirit and scope of the invention as defined in the appended claims.

What is claimed is:

1. A disc loading apparatus for an optical disc player, comprising:
   a motor disposed on a main plate to generate power;
   power transmission means for reducing and transmitting the rotational force provided by said motor including a shaft rotatably supported on supports fixedly secured together with support plates on said main plates, a set of reduction gears coupled to said motor to reduce the rotational force of said motor, and a power transmission gear mounted on one end of said shaft to transmit the rotational force reduced by said reduction gears to tray transfer means;
   said tray transfer means adapted to receive the rotational force of said motor through said power transmission means, thereby moving a tray horizontally and vertically;
   tray transfer guiding means disposed on said main plate to guide the tray transfer movement of said tray transfer means;

a turning station for rotating a disc transferred thereto and loaded thereon by said tray transfer means and said tray transfer guiding means;

said tray transfer means includes a tray horizontal transfer section for horizontally moving said tray by the rotational force received from said power transmission means; and said tray horizontal transfer section includes a rack formed at one side of the lower surface of said tray, a tray horizontal movement pinion positioned above said power transmission gear and meshed with said rack of said tray, and a lever pivotally mounted at one end to said shaft and connected at the other end to one side of said horizontal movement pinion to allow said horizontal movement pinion to be held in engagement with said rack of said tray at a given position.

2. The disc loading apparatus for an optical disc player as in claim 1, in which said tray transfer means further includes a tray vertical transfer section for vertically moving said tray carried by said tray horizontal transfer section.

3. The disc loading apparatus for an optical disc player as in claim 2, which said tray vertical transfer section comprises movable plates each having a pair of slots shaped to have horizontally extending, opposite end portions and a sloping portion interconnecting the end portions, and a rack provided at a lower portion of the interior surface thereof; and tray vertical movement pinions disposed one at each of both ends of said shaft and meshed with said racks of said movable plates to linearly move said movable plates.

4. The disc loading apparatus for an optical disc player as in claim 3, in which said tray transfer guiding means comprises horizonal movement guide pieces bent inwardly at upper ends of guide plates to be engaged with the upper ends of said movable plates; and vertical movement guide pieces formed vertically at the central portions of said guide plates to be engaged with guide pieces of tray support plates.

5. The disc loading apparatus for an optical disc player as in claim 1, in which said tray horizontal transfer section further includes a spring for applying a biasing force to said lever to resiliently urge said horizontal movement pinion against said rack of said tray; and an actuating member for pushing said lever to disengage said horizontal movement pinion from said rack of said tray, thereby stopping the horizontal movement of said tray.

* * * * *